United States Patent [19]
Lee et al.

[11] Patent Number: 5,390,135
[45] Date of Patent: Feb. 14, 1995

[54] PARALLEL SHIFT AND ADD CIRCUIT AND METHOD

[75] Inventors: Ruby B. Lee, Los Altos Hills, Calif.; Joel D. Lamb, Fort Collins, Colo.

[73] Assignee: Hewlett-Packard, Palo Alto, Calif.

[21] Appl. No.: 158,646

[22] Filed: Nov. 29, 1993

[51] Int. Cl.⁶ .......................... G06F 7/38; G06F 7/50
[52] U.S. Cl. .................................. 364/749; 364/786
[58] Field of Search ............ 364/749, 786, 757, 750.5, 364/745

[56] References Cited

U.S. PATENT DOCUMENTS

| | | | |
|---|---|---|---|
| 4,707,800 | 11/1987 | Montrone et al. | 364/786 X |
| 4,768,160 | 8/1988 | Yokoyama | 364/749 X |
| 4,914,617 | 4/1990 | Putrino et al. | 364/786 |
| 5,047,975 | 9/1991 | Patti et al. | 364/786 |
| 5,189,636 | 2/1993 | Patti et al. | 364/786 |

*Primary Examiner*—Tan V. Mai
*Attorney, Agent, or Firm*—Howard Boyle; Alan Haggard

[57] ABSTRACT

An apparatus for combining the contents of an X register, shifted by m places, with the contents of a Y register to generate a result Z. The functional unit can also be configured to perform parallel operations on sub-operands in the X and Y registers. The division of the apparatus into sub-operands is controlled by a mask which specifies the boundary of the sub-operands. The shifting operation is accomplished by multiplexers that connect the $p^{th}$ bit of the X register to the adder stage that operates on bit $Y_{p-m}$ of the Y register. Circuitry is provided at the boundary of the sub-operands to prevent the bit signals corresponding to the X register from being routed across a sub-operand boundary. Similarly, circuitry is provided for preventing the carry output of an adder stage that operates on one sub-operand from being propagated to an adder stage that operates on another sub-operand.

16 Claims, 3 Drawing Sheets

PARALLEL SHIFT AND ADD CIRCUIT AND METHOD

FIELD OF THE INVENTION

The present invention relates to computers, and more particularly, to arithmetic units for use therein.

BACKGROUND OF THE INVENTION

Computers normally include an arithmetic logic unit (ALU) that includes an adder that adds numbers of some maximum number of bits. Adders for words of length 32 and 64 bits are common in microprocessors and the like. While these adders will also operate on much smaller words, when doing so, the majority of the logic circuits contained in the adders are idle. For example, a 64-bit adder can be used to add two 8-bit words by placing each of the 8-bit words in the least significant portion of a corresponding 64-bit word and then adding the 64-bit words. During the addition, the logic circuitry concerned with adding the 7 high order bytes of each of the words is effectively idle. Hence, $\frac{7}{8}^{ths}$ of the capacity of the adder is being wasted during this operation.

Computations involving operations on a large number of small words are often encountered in multi-media data processing. Images are normally represented as arrays of pixels in which each pixel is represented by a word that is significantly smaller than maximum word size of the arithmetic logic unit. A gray scale image is typically represented by an array of one byte integers representing the light intensity at corresponding locations in the image. Similarly soundtracks are typically represented by arrays of one or two byte integers representing the intensity of the sound track as a function of time. Hence, multi-media data processing typically under utilizes the computational capacity of the arithmetic logic unit incorporated in the typical general purpose computer.

In addition to under utilizing the capacity of the ALU, this type of data processing often results in further inefficiencies resulting from the need to pack and unpack the data prior to operating on it in the ALU. For example, since storage space is always at a premium, the pixels of the image are typically packed into words. If the basic word size on the computer is 32-bits, the pixels of a gray scale image could be packed four per word. Consider an operation that must be performed on each pixel in the image. In addition to the time needed to perform the operation, the program must also unpack the pixel information prior to each computation and repack the result. These packing and unpacking operations further decrease the efficiency of the operation.

The computation times encountered in multi-media operations can be excessive. Hence, special parallel computer architectures are often employed to reduce the time between the execution of the sum image command and the time at which the sum image is completed. Multimedia processing operations performed on one pixel or sound sample are often independent of the operations being performed on the other pixels or sound samples; hence, the operations can be performed in parallel without regard to ordering. A computer with M adders can, in principle, provide a result in $1/M^{th}$ the time provided the movement of the pixels between memory and the adders does not become a bottleneck. Hence, it would be advantageous to provide a computer architecture in which multiple additions can be performed in parallel. Unfortunately, the cost of providing these additional ALUs and the hardware needed to control them is often prohibitive.

One class of computation that is often performed over a large data set is multiplication by a binary fraction. Such computation are common in filtering operations and in data compression and decompression operations. In these cases, the multiplication is by a constant.

Broadly, it is the object of the present invention to provide an improved ALU.

It is a further object of the present invention to provide an ALU that operates at high efficiency when multiple operations involving words that are smaller than the width of the ALU are processed.

It is a still further object of the present invention to provide an ALU that is adapted for computing a plurality of multiplications involving a binary fraction.

These and other objects of the present invention will become apparent to those skilled in the art from the following detailed description of the invention and the accompanying drawings.

SUMMARY OF THE INVENTION

The present invention is an arithmetic logic unit for operating on the contents of an X word having bits, $X_i$, and a Y word having bits, $Y_i$, to generate a result word having bits, $Z_i$, where i=0 0 to N−1. The X and Y words may be partitioned into subwords. $Z_0$ is the least significant bit of one of the sub-words, and $Z_{N-1}$ is the most significant bit of one of the sub-words. The arithmetic logic unit responds to a mask word for partitioning the X, Y and result words into a plurality of sub-words, there being one sub-word of the Y and result words corresponding to each sub-word of the X word. The invention generates the sum of each X sub-word divided by $2^m$ and the corresponding Y sub-word, to generate a result which is stored in the corresponding sub-word of the result word. Here m is a non-negative integer.

One embodiment of the invention is constructed from N single bit adders connected in an order sequence. Each single bit adder stage receives a first bit signal from the X word and a second bit signal from the Y word, the $i^{th}$ single bit adder in the sequence being connected to bit $Y_i$ in the Y-register. Each the single bit adder also receives a carry input signal. Each single bit adder adds the first and second bit signals and the carry input signal to generate a sum signal and a carry output signal, the sum signal generated by the single bit adder connected to $Y_i$ providing bit signal $Z_i$. The carry output signal of the single bit adder connected to $Y_i$ is connected to the carry input in the single bit adder connected to $Y_{i+1}$ for i=0 to N−1. The logic unit also includes N multiplexers, one multiplexer being connected to each adder stage and being responsive to a signal specifying m. The multiplexer connected to pth adder stage connects that stage to $X_{p+m}$, provided $Y_p$ and $Y_{p+m}$ are in the same sub-words of the Y word. The connections made for the remaining bits are determined by whether or not each of the X sub-words represents a signed or unsigned integer. If the X sub-words represent signed integers, the remaining bits are connected to the most significant bit of the appropriate X sub-word. If not, the remaining bits are connected to "0".

DETAILED DESCRIPTION OF THE INVENTION

The present invention is based on two observation. First, multiplication by a constant consisting of a binary fraction is equivalent to a plurality of additions involving a right shift performed on one of the addends. Consider the product of a binary fraction, f, and a number r. If the bits of f are $b_i$, for i=0 to B-1, then the product, p, can be written as $$p = \sum_{i=0}^{B-1} b_i * r \quad (1)$$

This allows the product to be decomposed into a plurality of summations that can be written in the form $$x + \frac{x}{2^k} \quad (2)$$

where k is a positive integer and x and is an integer that is either r or the result of some previous operation in a decomposition of this type. For example, r times the binary number 1.101 can be written as $$p = r + \frac{r}{2} + \frac{r}{8}$$

This operation can be performed in two operations, e.g.

$$x = r + \frac{r}{2} \quad \text{and} \quad p = x + \frac{r}{8}$$

If the binary fraction is a constant, the compiler can generate the appropriate instructions to decompose the multiplication into the required operations. Each of these operations can in term be written as a sum of two operands in which one of the operands is the content of a register shifted by m-bits to the right. Hence, it would be advantageous to have an ALU that implements an instruction of the form "shift right by m and add".

The second observation relates to a simple hardware modification that allows an otherwise conventional adder to be used to add multiple small operands in a single machine cycle. In principle, the adder can be divided into a plurality of partitions, each partition operating on words of a size smaller than the full width of the adder. The sum of the bits in each partition must be less than or equal to the width of the adder. In each machine cycle, a plurality of add operations can be performed on these smaller words. In addition, the adder can be used as a conventional adder.

While embodiments of the present invention in which the width of the ALU is divided into arbitrary size words are possible, and will be discussed in more detail below, the preferred embodiment of the present invention of the present invention provides an adder that can be divided into only a few of the possible word combination. For example, a 32 bit adder is preferably broken into partitions that allow words that are one or two bytes in length to be added. To simplify the following discussion, it will be assumed that the ALU is divided in half. In this case, two half-word adds or one full word add may be performed in each machine cycle.

Figure 1:
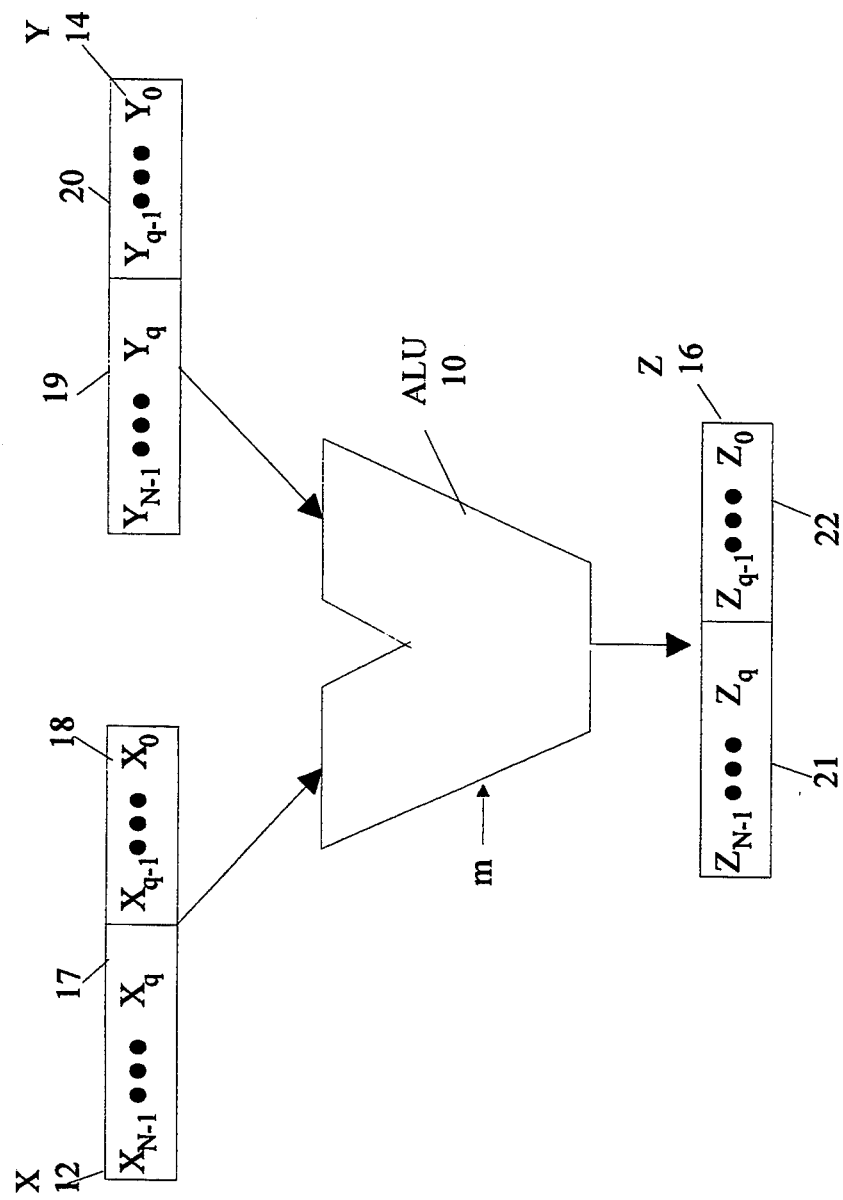
FIG. 1 illustrates the manner in which an ALU according to the present invention operates in relation to the contents of two registers.

Referring to FIG. 1, an ALU 10 according to the present invention accepts two N bit operands 12 and 14. The bits of the first operand will be denoted by $X_i$, for i=0 to N−1, the bits of the second operand will be denoted by $Y_i$. The operands are typically stored in two of the registers in the CPU of the computer. When operated in full width mode, ALU 10 generates an N-bit output word 16 having the two's complement sum of X, right shifted by m bits, and Y. The bits of output of ALU 10 will be denoted by $Z_i$ in the following discussion. The result of the addition is typically stored back into one of the CPU registers.

In the following discussion, the bits in the various words will be numbered from least significant to most significant. That is $X_0$ is the least significant bit of operand X, and $X_{N-1}$ is the most significant bit of the X operand. The same convention will be used for the Y and Z words.

The present invention allows each of the operands to be divided into a plurality of sub-words. For simplicity, the present invention will be explained first in terms of a single division of each of the operands into partial operands. In this case, the first q bits of the X operand, $X_0$ through $X_{q-1}$, are the bits of the first partial operand 18 of the X word, and the remaining bits, $X_q$ through $X_{N-1}$ are the bits of the second partial operand 17 of the X word. The Y operand is similarly divided into partial words 19 and 20. In this mode, bits $Z_O$ through $Z_{q-1}$ are the bits of the sum of partial operand 18 shifted by m bits and partial operand 20, and bits $Z_q$ through $Z_{N-1}$ are the bits of the sum of partial operand 17 shifted by m bits and partial operand 19, respectively.

For practical reasons, m is typically limited to an integer less than or equal to 4. A conventional ALU includes a facility to generate the 2's complement of the Y operand prior to the addition. As will be explained in more detail below, the present invention includes a novel shifter that operates on the X operand prior to addition. To assure that the introduction of this shifter does not degrade the performance of the ALU, the delays inherent in the shift operation must be no greater than those encountered by the Y operand in passing through the 2's complement hardware. In practice, this limits m to the above mentioned values.

In the preferred embodiment of the present invention, the partial operands are signed integers. In the event of an overflow or underflow, the results are clamped at the maximum or minimum values, respectively, for signed integers of the length in question. For example, if N=32 and half word shift (i.e., 16-bit) and add operations are implemented, the results would be clamped at hexadecimal 7FFF and 8000, respectively.

Figure 2:
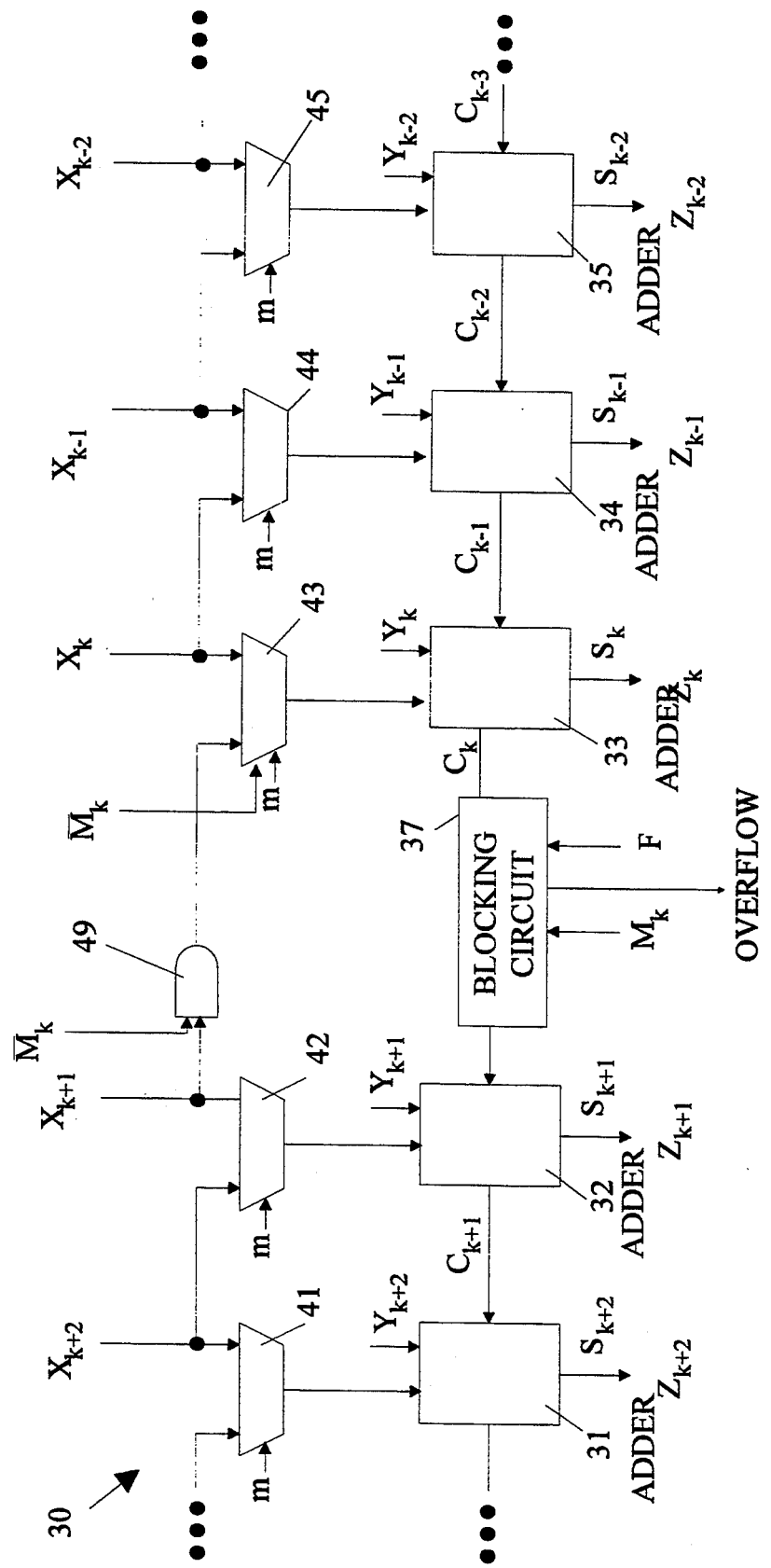
FIG. 2 is a block diagram of a portion of an ALU according to the present invention which may be broken into two sub-operands and which can also perform a right shift by one place on the X operands prior to addition.

To simplify the follow rag discussion, the present invention will first be explained with reference to an ALU that performs a shift right by one place of the X operands and then adds the shifted operands to the corresponding Y operands. To further simplify the discussion, it will be assumed that the ALU is constructed from a plurality of single bit adders that utilize carry propagation during addition. Refer now to FIG. 2 which is a block diagram of a portion of an ALU 30 according to the present invention which may be broken into two sub-operands and which can also perform a right shift by one place on the X operands prior to addition. The boundary between the two sub-operands occurs at bit position k of ALU 30. That is, bit k is the most significant bit of one set of sub-operands, and bit k+1 is the least significant bit of the other set of sub-operands. The adding section of ALU 30 is constructed from an array of one bit adder stages in a manner similar to that of conventional carry propagation adders. Exemplary single bit adders are shown at 31-35. In the present invention, the stages may be decoupled to allow the ALU to perform parallel additions on the partial words. Each single bit adder adds two bits, one derived from the X operand and one derived from the Y operand, and a carry bit from the previous stage in the adder, denoted by $C_{i-1}$ for the $i^{th}$ stage, to generate a sum bit and a new carry bit. The two stages shown at 33 and 32 are the single bit adders used to add the most significant bits of partial operands 18 and 20 and the least significant bits of partial operands 17 and 19, respectively. Single bit adder 33, for example, adds bits $C_{k-1}$, $X_k$ and $Y_k$ to generate sum bit $S_k$ and carry bit $C_k$. In the following discussion the stage of the adder that acts on $Y_p$ will be referred to as the $p^{th}$ stage of the adder. In a conventional adder, the carry bit from each stage is propagated to the next stage by connecting the carry bit input of each stage to the carry bit output of the stage before it in the array of one bit adders.

In the present invention, the carry bit from the stage just before the boundary separating the two partial operands is connected to a blocking circuit 37. If ALU 30 is being used as a conventional adder operating on the entire contents of registers 12 and 14 treated as single words, blocking circuit 37 connects the carry output of single bit adder 33 to the carry input of single bit adder 32. If ALU 30 is being used to perform two adds in parallel with partial word boundary between bits k and k+1 in each register, then blocking circuit 37 forces the carry bit from single bit adder 33 to be a 0 on addition. This is controlled by a boundary signal $M_k$. The carry outputs of all of the other single bit adders are connected in the conventional manner in the remaining stages of ALU 30. Hence, carry bits propagate in the conventional manner within each section of ALU 30 that is operating on a particular partial operand. The sum bits from each adder stage are connected to the corresponding bits of the output port which are denoted by $Z_k$.

The above description of ALU 30 assumed that additions of the operands was taking place. Blocking circuit 37 replaces the carry bit by 0 during an addition in which the adder is divided into sub-adders with a boundary at the blocking circuit. If the adder is to be also used for 2's complement subtractions in which the adder is likewise divided, the carry bit must be forced to be a 1 instead of a 0. Blocking circuit 37 shown in FIG. 2 implements both additions and subtractions by providing an input F having a value of either "0" or "1". When a boundary is active at blocking circuit 37, the value off is the value presented to the next stage. If the boundary is inactive, then blocking circuit 37 merely transmits the carry bit, $C_k$, to the next stage.

In conventional adders, a signed overflow signal is calculated from the most significant bit of the operands and the most significant bit of the result. An unsigned overflow is calculated from the carry bit from the most significant bit adder operating on the most significant bit of the operands. If this feature is to be implemented for each of the partial operands, the overflow signal from the addition of each partial operand is connected to an appropriate overflow circuit. In one embodiment of the present invention, the overflow signals are ORed together, and the resultant signal is used to detect an overflow. This bit can be used to trigger a trap or it may be ORed with the contents of a single bit register. In the later case, the program can check the contents of the register to determine if any operation since the last time the register was checked has resulted in an overflow.

As noted above, ALU 30 is designed to shift the contents of the X register to the right one position prior to addition. This is accomplished in response to a signal m by 2-to-1 multiplexers that connect the bits of the X operands to the proper single bit adder stages. Exemplary multiplexers are shown at 41-45 in FIG. 2. If a multiplexer control signal is true, $X_p$ is connected to the single bit adder for stage (p-1). If the control input is false, the bit is connected to stage p.

If the ALU is operating on signed integers, the most significant bit of each operand must be replicated at its original position as well as being copied to its new position, since this bit is the sign bit. Hence, the multiplexers on boundary of two sub-words must be different from the multiplexers that are connected to X bits that can only be in the interior of a sub-operand. Multiplexer 43 is such a multiplexer. Multiplexer 43 connects $X_k$ to stage k when m is true and the X register is partitioned such that stage $X_k$ is the most significant bit of an operand. If the X register is not so partitioned, i.e., $M_k$ is false, then multiplexer 43 behaves in the same manner as the other multiplexers.

In the preferred embodiment of the present invention, the location of the stage on the boundary of operands is specified by a mask whose bits are denoted by $M_p$. The bits $M_p$ specify the location of the most significant bit of each partial operand. This mask will be referred to as the boundary mask in the following discussion. The bits of the mask may be stored in a register in the ALU or may be generated directly from the instruction being executed by the instruction decoding circuitry of the processor in which the adder is located.

While the above embodiments of the present invention have been described in terms of an adder that is constructed from single bit adders utilizing carry propagation, it will be apparent to those skilled in the art that the teachings of the present invention may be applied to a wide variety of adder configurations. Any adder configuration in which the adder may be broken into sub-adders such that the most significant bit of each possible sub-operand is located on a boundary of a sub-adder may be configured to operate in the present invention. The adder is altered by introducing a circuit that interrupts the carry from the sub-adder when the adder is partitioned at the sub-adder in question.

In the preferred embodiment of the present invention, carry look ahead architecture is used because it has smaller delays. In a carry look ahead adder, the carry generation circuitry produces a propagate and a generate signal corresponding to each bit of the adder. These signals may be used in a manner analogous to the carry bits described above to allow the adder to be broken into parallel sub-word adders. Consider the case in which the adder is to be divided such that stage k operates on the most significant bit of the sub-word result. A blocking circuit such as blocking circuit 37 shown in FIG. 2 can be inserted into the carry generation logic such that the propagate bit and the generate bit are forced to the appropriate values depending on the type of operation, i.e., addition or subtraction, that is being performed. When the adder is being used on words that are not broken at stage k, the blocking circuit does not alter the values of the propagate and generate bits corresponding to stage k.

The embodiment of the present invention shown in FIG. 2 is designed to shift the X operands right only one place. It will be apparent from the discussion above, however, that the same principles may be used to provide an ALU that shifts the X operands right by an arbitrary amount, $m < \mu$. In this case, the 2-to-1 multiplexers shown at 41–45 would be replaced by $(\mu+1)$-to-1 multiplexers. The signal, m, must be capable of specifying which of the $(\mu+1)$ possible shift positions is being specified. If stage p of the adder can only operate on an internal bit of an operand, the multiplexer connected thereto connects stage p to $X_{p+m}$. If, however, stage p is within m stages of a potential sub-word boundary, then the multiplexer associated with stage p must examine the mask bits as well as the shift signal m. Consider the case in which the mask bits indicate that a boundary is active at stage k, i.e., $X_k$ is the most significant bit of a sub-word. Then the multiplexer associated with stage p must copy $X_k$ to the adder of stage p if $(k-m) < p < k$. It should be noted that $X_k$ will be connected to one of the inputs on each of the multiplexers in question.

Any input connection that crosses a possible operand boundary must include a gate such as gate 49 shown in FIG. 2. This gate blocks the propagation of the data bit across the boundary if the boundary is active. That is, if adder stage p is connected to input line $X_q$, this connection must include a gate that breaks the connection if $M_k$ is true for any k from q to p-1.

If X is always an unsigned integer, then the blocking gates such as gate 49 are required; however, multiplexer 43 may be constructed from a multiplexer that is the same as the other multiplexers (i.e., 41, 42, 44, and 45). If X is a signed integer, then $\mu$ bits of M must be input to multiplexer 43, making it different from the other multiplexers. In this case, the blocking gates such as gate 49 may be omitted, since their mode of operation makes these gates unnecessary.

The right shift operation can lead to a round off error. Round off error occurs when a 1 is shifted off the X sub-word. The embodiments of the present invention described above round the result by truncation. While truncation may be used in rounding the result of an integer divide, it can cause undesirable problems that can be prevented by other forms of rounding. For example, truncation leads to errors in the case in which the division is being applied to a collection of words and the average value of the collection is important. Truncation rounding leads to a shift in the average value, since all values are rounded to the next smaller integer.

In the preferred embodiment of the present invention, round odd logic is used to prevent this type of biasing. In round odd systems, the result is rounded to the nearest odd integer if a round off error is created by the right shift. If the answer is exact before rounding, no change is made. A round off error occurs when ever a 1 is shifted off the result. This occurs when the m least significant bits before shifting include at least one "1".

Here, m is the number of bits shifted. In round odd systems, the least significant bit of the result is set to a "1" if a "1" was shifted off of the word. If all the bits shifted out are "0", then the result was exact even after the shift, and the least significant bit of the result is unaltered.

Figure 3:
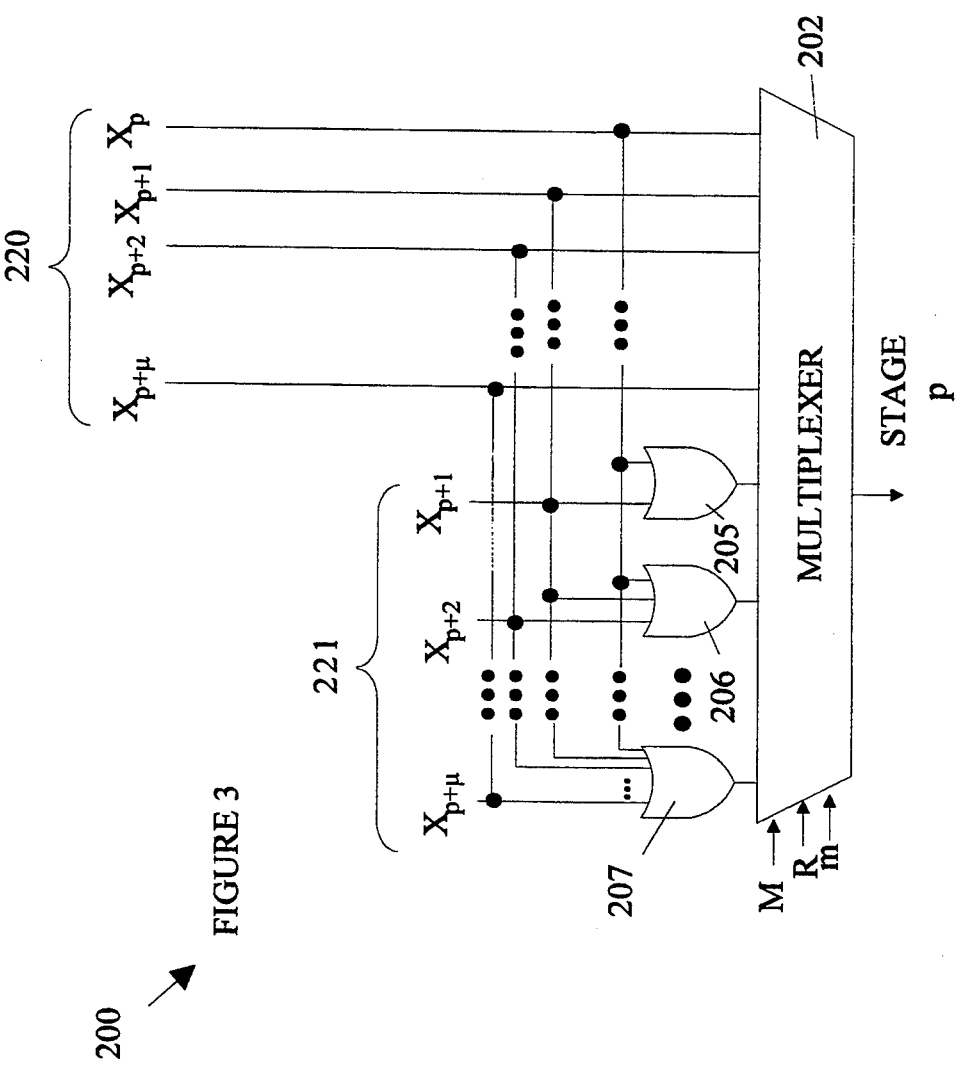
FIG. 3 is a block diagram of a multiplexer arrangement that implements round odd on the least significant bit of a result.

A round odd system may be included in the present invention by replacing the multiplexer connected to stage p by the multiplexer arrangement shown in FIG. 3 at 200 if stage p may operate on either an internal bit of a sub-word or the least significant bit of a sub-word. The arrangement includes a $(2\mu+1)$ 1)-to-1 multiplexer 202 that is controlled by a round signal, a shift signal m, and the mask bits, M. The inputs to multiplexer 202 may be broken into two groups. Group 221 are used when stage p operates on the least significant bit of a sub-word and the round signal, R, indicates that rounding is to be performed. In this case, stage p is connected to a signal having the value $(X_p \text{ OR } X_{p+1} \text{ OR } \ldots X_{p+m})$ by selecting the $m^{th}$ input of group 221. The $m^{th}$ input of group 221 is connected to an OR circuit having inputs of $X_p$ through $X_{p+m}$. Exemplary OR circuits are shown at 205–207. If rounding is not to be performed, then stage p is connected to the mth input of group 220. In this later mode, multiplexer arrangement behaves in the same manner as the other $(\mu+1)$-to-1 multiplexers connected to stages that can only operate on internal bits of sub-words.

It can be shown that the average error obtained with this form of rounding is zero provided the least significant $(m+1)$ bits of X are uniformly distributed prior to shifting. It should be noted that a round even system also prevents biasing in rounding. In a round even system, the result is rounded to the nearest even integer if a round off error will occur and the result prior to rounding is odd. However, the hardware needed to implement a round even scheme is significantly more complex than that described above; hence, round odd systems are preferred.

While the above described embodiments of the present invention have provided either for full word operation or parallel operations on two half words, it will be apparent to those skilled in the art that embodiments in which the boundaries and/or the number of sub-operands differ from those described above may be implemented using the above teachings. The only limit on the number of suboperands is that the sum of the bits in the sub-operands must not be greater than the width of the ALU operating in full width mode. Similarly, the sub-operand boundaries can, in principle, be set between any two bits in the ALU by setting the corresponding mask bit.

While the above described embodiments of the present invention have been described in terms of computing the sum of each sub-word in the X sub-word divided by $2^m$ and the corresponding sub-word in the Y word, It will be apparent to those skilled in the art that the present invention can also provide the difference of each sub-word in the X word divided by $2^m$ and the corresponding sub-word in the Y word. As noted above, most ALUs provide circuitry for replacing the Y input by the 2's complement thereof. Hence, the differences in question can be computed by utilizing this conventional circuitry on the Y operand.

While the present invention has been described in terms of an ALU that is partitionable, it will be apparent to those skilled in the art that the present invention provides advantages even when operating on non-partitioned data words. In this case, the present invention allows a divide and add to be carried out in a single machine cycle in response to a single instruction.

While the above embodiments of the present invention have been described in terms of instructions as the means for triggering the various operations performed by the present invention, it will be apparent to those skilled in the art that the operations of the present invention may be triggered by electrical signals that are not generated by instructions of a stored computer program. Hence, the term "instruction" when used in the claims shall also include operations triggered by other forms of signaling. Furthermore, it will be apparent to those skilled in the art that the present invention may be used in circuitry that is not part of a computer.

Various modifications to the present invention will become apparent to those skilled in the art from the foregoing description and accompanying drawings. Accordingly, the present invention is to be limited solely by the scope of the following claims.

What is claimed is:

1. An apparatus for operating on the contents of an X word having bits $X_i$ and a Y word having bits $Y_i$ to generate a result word having bits $Z_i$, where $i=0$ to $N-1$, where $Z_0$ is the least significant bit and $Z_{N-1}$ is the most significant bit, said apparatus comprising:
   means for partitioning said X, Y and result words into a plurality of sub-words, there being one sub-word of said Y and result words corresponding to each sub-word of said X word; and
   means, responsive to a first instruction, for generating the sum of each X sub-word divided by $2^m$ and the corresponding Y sub-word, the result thereof determining said corresponding sub-word of said result word, wherein m is an integer different from 0.

2. The apparatus of claim 1 further comprising means, responsive to a second instruction, for generating the difference of each sub-word in said X word divided by $2^m$ and the corresponding sub-word in said Y word, the result thereof determining said corresponding sub-word of said result word.

3. The apparatus of claim 1 wherein the result of dividing each said sub-word in said X word is rounded to the next highest odd integer if said division by $2^m$ resulted in a round-off error.

4. The apparatus of claim 1 comprising multiplexing means for directing bits of said X word and adding means for adding bits derived from said X and Y words, said adding means comprising:
   a plurality of Y input means, each said Y input means receiving a bit derived from said Y-word, said Y-input means receiving said bit derived from $Y_p$ being referred to as the $p^{th}$ Y input means;
   a plurality of X input means, each said X input means receiving a bit derived from said X word, therebeing one said X input means corresponding to each said Y input means, said X input means corresponding to the $p^{th}$ Y input means being referred to as the $p^{th}$ X input means; and
   a plurality of adding stages connected in series, each adding stage comprising means for adding one or more bits of received on said X input means and the corresponding bits received on said Y input means, and means for propagating a carry bit from said adding stage to the next said adding stage in said series connection, said adding stage operating on $Y_p$ being referred to as the $p^{th}$ said adding stage, and wherein said partitioning means comprises means for forcing said carry bit to a value determined by the operation being performed if said adding stages operate on bits of different sub-words in said X word, and wherein
   said multiplexing means comprises a plurality of multiplexing circuits, there being one said multiplexing circuit connected to each said adding stage, said multiplexing circuit connected to said $p^{th}$ adding stage connecting said adding stage to $X_{p+m}$ if $Y_p$ and $Y_{p+m}$ are in the same said sub-word of said Y word.

5. The apparatus of claim 4 wherein said multiplexing circuit connected to said $p^{th}$ adding stage connects the most significant bit of one of said X sub-words to said $p^{th}$ adding stage if $Y_p$ and $Y_{p+m}$ are in different said sub-words of said Y word.

6. The apparatus of claim 4 wherein said multiplexing circuit connected to said $p^{th}$ adding stage connects a signal having the value 0 to said $p^{th}$ adding stage if $Y_p$ and $Y_{p+m}$ are in different said sub-words of said Y word.

7. The apparatus of claim 4 further comprising means for generating a signal having the value ($X_p$ OR $X_{p+1}$ OR ... $X_{p+m}$) and connecting said signal to said $p^{th}$ adding stage when $Y_p$ is the least significant bit of one of said sub-words.

8. The apparatus of claim 7 further comprising a storage cell for storing the value of said generated signal.

9. The apparatus of claim 4 wherein said partitioning means further comprises means for generating a signal indicating that one of said carry bits was a "1" prior to said carry bit being forced to said determined value.

10. An apparatus for operating on the contents of an X word having bits $X_i$ and a Y word having bits $Y_i$ to generate a result word having bits $Z_i$, where $i=0$ to $N-1$, where $Z_0$ is the least significant bit and $Z_{N-1}$ is the most significant bit, said apparatus comprising:
    means, responsive to a first instruction, for generating the sum of said X word divided by $2^m$ and Y word; and
    means for generating said result word from the result of said addition, wherein m is an integer different from 0.

11. The apparatus of claim 10 further comprising means, responsive to a second instruction, for generating the difference of said X word divided by $2^m$ and said Y word, the result thereof being stored in said corresponding sub-word of said result word.

12. The apparatus of claim 10 wherein the result of dividing each said X word is rounded to the next highest odd integer if said division by $2^m$ resulted in a round-off error.

13. The apparatus of claim 10 comprising multiplexing means for directing bits of said X word and adding means for adding bits derived from said X and Y words, said adding means comprising:
    a plurality of Y input means, each said Y input means receiving a bit derived from said Y-word, said Y-input means receiving said bit derived from $Y_p$ being referred to as the $p^{th}$ Y input means;
    a plurality of X input means, each said X input means receiving a bit derived from said X word, therebeing one said X input means corresponding to each said Y input means, said X input means corresponding to the $p^{th}$ Y input means being referred to as the $p^{th}$ X input means; and a plurality of adding stages connected in series, each said adding stage comprising means for adding one or more bits received on said X input means and the corresponding bits received on said Y input means, and means for propagating a carry bit from said adding stage to the next said adding stage in said series connection, said adding stage operating on $Y_p$ being referred to as the $p^{th}$ said adding stage, and wherein said multiplexing means comprises a plurality of multiplexing circuits, there being one said multiplexing circuit connected to each said adding stage, said multiplexing circuit connected to said $p^{th}$ adding stage connecting said adding stage to $X_{p+m}$ if $p+m<N$.

14. The apparatus of claim 13 wherein said multiplexing circuit connected to said $p^{th}$ adding stage connects said adding stage to a signal having logical value 0 if $p+m>(N-1)$.

15. The apparatus of claim 13 wherein said multiplexing circuit connected to said $p^{th}$ adding stage connects said adding stage to $X_{N-1}$ if $p+m>(N-1)$.

16. The apparatus of claim 13 further comprising means for generating a signal having the value ($X_0$ OR $X_1$ OR ... $X_m$) and connecting said signal to said $0^{th}$ adding stage.

* * * * *